Jan. 5, 1960   E. QUIMBY SMITH, JR., ET AL   2,919,544
STEERING MECHANISM FOR JET PROPELLED CRAFT
Filed Jan. 10, 1956   2 Sheets-Sheet 1

INVENTORS
E. QUIMBY SMITH JR.
BY LYLE E. MATTHEWS

ATTORNEYS

Jan. 5, 1960   E. QUIMBY SMITH, JR., ET AL   2,919,544
STEERING MECHANISM FOR JET PROPELLED CRAFT
Filed Jan. 10, 1956   2 Sheets-Sheet 2

INVENTORS
E. QUIMBY SMITH JR.
BY LYLE E. MATTHEWS
ATTORNEYS

United States Patent Office 2,919,544
Patented Jan. 5, 1960

2,919,544

STEERING MECHANISM FOR JET PROPELLED CRAFT

E. Quimby Smith, Jr., and Lyle E. Matthews, Oxnard, Calif., assignors to United States of America as represented by the Secretary of the Navy Application January 10, 1956, Serial No. 558,387

7 Claims. (Cl. 60—35.54)

(Granted under Title 35, U.S. Code (1952), sec. 266)

The invention described herein may be manufactured and used by or for the Government of the United States of America for governmental purposes without the payment of any royalties thereon or therefor.

This invention relates to steering mechanisms for craft employing reaction motors and the like, and more particularly to such a steering mechanism utilizing a split ring-like member mounted adjacent the jet exhaust and capable of producing and controlling roll characteristics of the craft.

The high speed imparted to aircraft, and especially to guided missiles, by various reaction type propulsion motors has necessitated the design of steering controls that minimize drag and reduce the requirement of large control forces inherent in conventional aircraft controls, such as elevators, ailerons, and air vanes.

This new type of steering control is illustrated by U.S. Patents No. 2,693,079 and No. 2,472,839, and may be called a reaction type control or "jetavators" in that they are mounted adjacent the exhaust opening of the reaction motor, which may be ram-jet, turbo-jet, or the like. These reaction controls are operable to deflect the high velocity fluid discharge from the motor so as to exert both vertical and horizontal steering movements to the craft. In Patent No. 2,472,839 the steering mechanism is used as an auxiliary control and comprises a concentric hood positioned over the discharge orifice of the jet motor being mounted thereto by a gimbel ring. In Patent No. 2,693,079, the reaction type control consists of a pair of movable discs housed within the jet exhaust orifice, the discs intersecting along a common diameter coextensive with the longitudinal axis of the exhaust orifice.

These prior art mechanisms may be generally suitable for directional attitude control of the aircraft in both the horizontal (yaw) and vertical (pitch) axes, however, they have little effect in roll attitude control, the latter controlling the aircraft's rotation about the longitudinal axis. Roll attitude control is important in guided missiles as it is usually desirable to impart a controlled roll to a missile, and, also, because aircraft having planiform wing structures are better maneuvered to a target by employing pitch and roll controls.

Roll attitude control can be accomplished by utilizing two or more motors tiltable in opposite directions to produce the desired twisting force. Similarly, one jet motor could be designed with two nozzles to produce roll. It is apparent that these approaches require a larger airframe, and more complicated controls, greatly increasing missile construction costs and total weight.

The present invention provides a steering mechanism which is simple in construction, easier to operate, and usable on present airframes having a single jet nozzle without extensive modification. The steering mechanism utilizes a jet vane constructed of a split sleeve or ring preferably circumscribing the jet nozzle adjacent to the nozzle discharge orifice and movable to deflect the jet stream. The split ring is not limited to a circular configuration and the shape may vary, for example, it may be elliptical or substantially rectangular depending on the cross-sectional shape of the nozzle to which the ring preferably should conform.

Each segment of the ring, preferably extending substantially half of the ring's periphery, is pivoted to the craft at an intermediate point to permit corresponding ends of the segments to be moved into the jet stream in the same direction, or in opposite directions to produce a differential action, depending on the desired missile direction. The particular mechanism and controls for actuating the control ring are not a part of this invention and any conventional system may be employed.

A principal object of this invention is to provide a steering mechanism capable of controlling the roll characteristics of a craft having a single reaction propulsion motor.

Another object is to provide a steering mechanism capable of controlling the roll and pitch movements of an aircraft having a single jet propulsion motor with a minimum amount of loss of thrust due to drag.

Still another object is to provide a steering mechanism that has a "fail-safe" feature, that is, one that will return to a neutral position upon failure of the actuating control force.

Further objects are to provide a steering mechanism which is simple in construction, light-weight, and easily controlled.

Other objects and many of the attendant advantages of this invention will be readily appreciated as the same becomes better understood by reference to the following detailed description when considered in connection with the accompanying drawings wherein.

Figure 1:
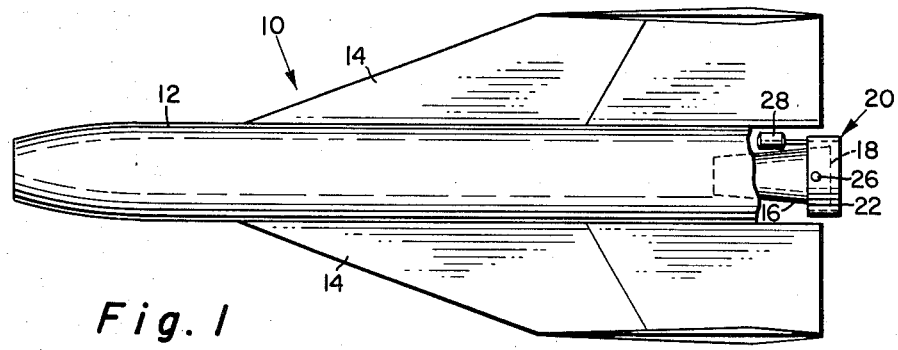
Fig. 1 is a diagrammatic elevation view of an aircraft, partly in section, showing a steering mechanism constructed in accordance with the principles of this invention.
Figure 2:
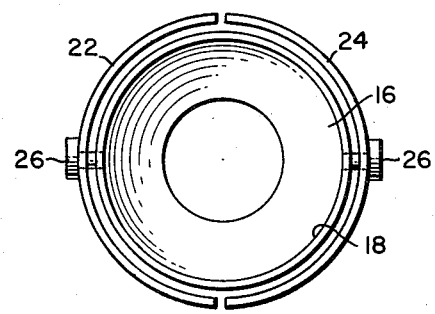
Fig. 2 is an enlarged rear view of the steering mechanism of Fig. 1 shown in neutral position.

Referring to Fig. 1 of the drawing, there is shown a typical aircraft 10 of a reaction propulsion type having a body 12 and wings 14. The propulsion motor is provided with the usual nozzle 16 delineating a discharge orifice 18 through which the high velocity fluid medium is ejected for propelling the aircraft. This invention is directed to a steering mechanism generally indicated by reference numeral 20 which is mounted on the tail portion of the craft adjacent the discharge orifice and being movable to deflect the discharge stream and thereby control the direction of aircraft movement. Steering mechanism 20 comprises preferably a split ring-like member or sleeve having complementary sectors 22 and 24 conforming generally to the peripheral configuration of the discharge orifice. In Fig. 2 steering sectors 22 and 24 are shown to be substantially semi-cylindrical conforming to nozzle 16 being cylindrical in cross section, while in Figs. 7 and 8 the sectors are elliptical and rectangular, respectively, corresponding to similarly shaped nozzles for reasons later to be described.

The steering sectors may be laterally positioned either to the interior or exterior peripheral surface of the discharge orifice, the latter construction being illustrated and preferred because the loss of thrust is minimized and only the effective portion of the sectors are in the high-temperature, corrosive flow at any given time. The width of the sectors will depend on various design considerations.

Each steering sector, which can be identical in construction, is provided with a trunnion 26 rotatably supported in nozzle 16 and preferably pivotable about a common axis in the horizontal plane intersecting the longitudinal axis of the propulsion motor. Each trunnion 26 is shown located at a central point in the sector to permit the opposite ends of the sector to move equal amounts into the discharge flow; however, the pivot point can be positioned at any other intermediate point if an unequal swing is desired for any reason. Nozzle 16 is tapered to receive the inactive end of the sector as the opposite deflecting end is swung into the jet stream permitting a minimum of clearance between the inner periphery of the steeirng rings and the nozzle. A minimum clearance throughout the arc of movement is also maintained by positioning each trunnion 26 forward of the vertical center line.

A conventional actuating mechanism shown schematically at 28 may be employed to move the steering members in accordance with the guidance signals and forms no part of this invention. An important feature of the steering members of this invention resides in a "fail-safe" operation to return to neutral position (Fig. 2) upon failure of the actuating mechanism.

Figure 3:
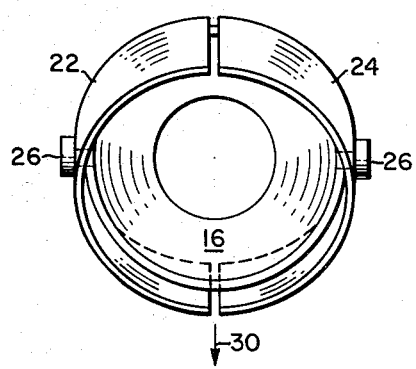
Fig. 3 is a similar view showing the steering mechanism positioned to induce a dive attitude to the aircraft.
Figure 4:
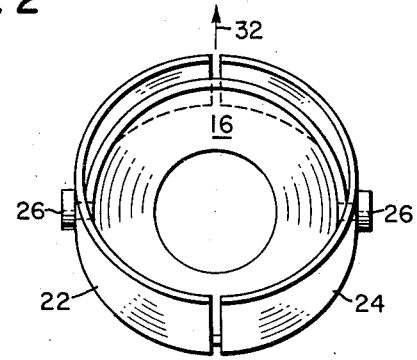
Fig. 4 is a similar view showing the steering mechanism positioned to induce a climb attitude to the aircraft.
Figure 5:
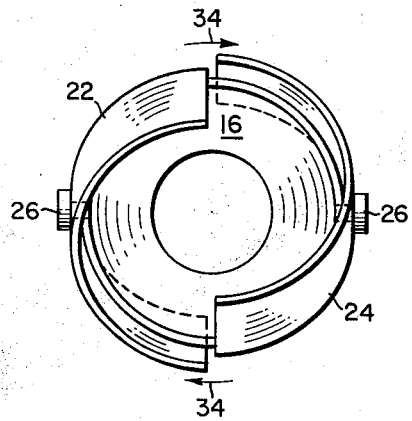
Fig. 5 is a similar view showing the steering mechanism positioned to induce a clockwise roll attitude.
Figure 6:
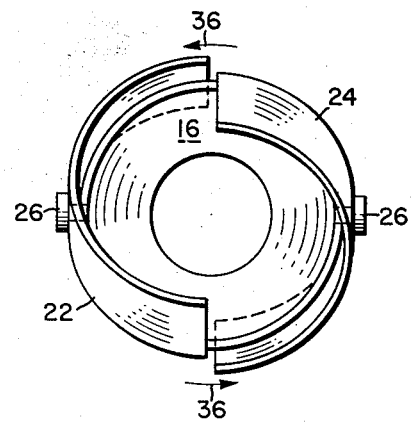
Fig. 6 is a similar view showing the steering mechanism positioned to induce a counterclockwise roll attitude.

In Fig. 3, both upper corresponding ends of the steering members 22 and 24 are moved downstream an equal amount into the jet stream causing the aircraft to assume a dive attitude as indicated by an arrow 30. The lower ends of the steering members are in an inoperative position out of the jet stream. In Fig. 4 both lower corresponding ends of the steering member 22 and 24 are moved downstream into the jet stream an equal amount causing the aircraft to assume a climb attitude as indicated by arrow 32. In Fig. 5, the upper end of steering member 22 and the lower end of steering member 24 are moved downstream in a differential manner providing a thrust moment on each side of the longitudinal axis of the missile in a clockwise direction causing the aircraft to take a clockwise roll attitude as shown by arrow 34. In Fig. 6, the direction of movement of steering members 22 and 24 are reversed to that of Fig. 5 and the aircraft assumes a counterclockwise roll attitude as shown by arrows 36.

Figs. 3–6 illustrate the simple, basic maneuvers caused by steering members 22 and 24 and it is obvious that numerous combinations of movements are obtainable to give that pitch and roll attitude necessary to steer the aircraft in the desired direction.

Figure 7:
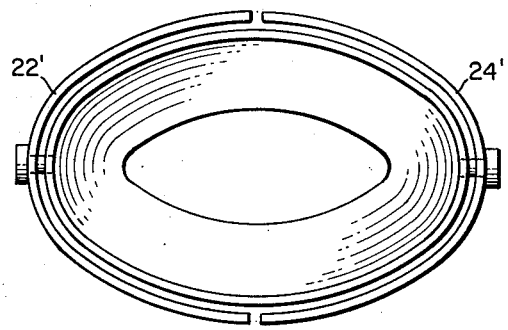
Figs. 7 and 8 are rear views of modified configurations of the steering mechanism.

Fig. 7 illustrates a modified steering mechanism wherein the steering ring members 22' and 24' are substantially semi-elliptical in configuration which has the advantage of increasing the length of the moment arm of the center of control force, and, consequently the roll control moment. As shown, the steering members substantially conform to the elliptical configuration of the jet nozzle orifice.

Figure 8:
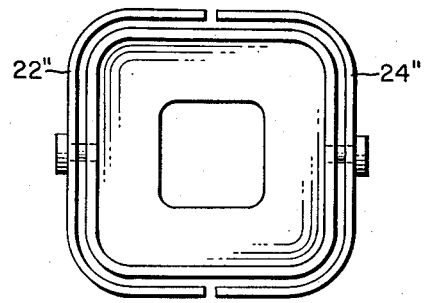

The modified steering mechanism in Fig. 8 is shown with substantially semi-rectangular steering members 22" and 24" which present the advantage of increasing the control surface area in the jet stream.

The steering mechanism of this invention provides an extremely simple and effective pitch and roll attitude control for all types of jet propelled craft. While the invention is particularly suitable for use in jet aircraft, it will be understood that the principles are applicable to any water or land craft having a reactive propulsion motor and operating in a fluid medium. The simplified construction of the ring-like steering members offers numerous advantages in weight and drag reduction. As the steering members can be identical in configuration, construction costs can be reduced, and storage needs simplified.

Obviously many modifications and variations of the present invention are possible in the light of the above teachings. It is therefore to be understood that within the scope of the appended claims the invention may be practiced otherwise than as specifically described.

We claim:

1. In an aircraft, in combination, a jet nozzle having a longitudinal axis, at least two steering members for controlling roll attitude and directional attitude, said steering members pivotally mounted on the exterior of the nozzle respectively on opposite sides of a plane containing said axis, each of said members having opposite ends provided with respective control surfaces, each of said members being pivoted about a single point intermediate said ends, the ends of each member being movable about their axis alternatively to position the respective control surfaces into and out of the discharge flow through said nozzle, said members being rotatable in opposite directions about their respective pivots to induce a corresponding roll moment about the longitudinal axis of the nozzle.

2. The combination of claim 1 wherein the shape of the steering members conform generally to the cross-sectional configuration of the nozzle.

3. In an aircraft, in combination, a jet nozzle having a longitudinal axis, at least two curved steering members for controlling roll attitude and directional attitude, said steering members pivotally mounted on the exterior of the nozzle respectively on opposite sides of a plane containing said axis, each of said members having opposite ends provided with respective control surfaces, each of said members being pivoted about a single axis intermediate said ends, said axes extending normal to said plane, the ends of each member being movable about their axis alternatively to position the respective control surfaces into and out of the discharge flow through said nozzle, said members being rotatable in opposite directions about their respective pivots to induce a corresponding roll moment about the longitudinal axis of the nozzle.

4. The combination of claim 3 wherein said curved steering members are semicylindrical in configuration.

5. In an aircraft, in combination, a jet nozzle having a longitudinal axis, at least two semielliptical steering members for controlling roll attitude and directional attitude, said steering members pivotally mounted to the exterior of the nozzle respectively on opposite sides of a plane containing said axis, each of said members having opposite ends provided with respective control surfaces, each of said members being pivoted about a single axis point intermediate said ends, said axes extending normal to said plane, the ends of each member being movable about their axis alternatively to position the respective control surfaces into and out of the discharge flow through said nozzle, said members being rotatable in opposite directions about their respective pivots to induct a corresponding roll moment about the longitudinal axis of the nozzle.

6. A steering device for controlling roll attitude and directional attitude in an aircraft having a jet exhaust nozzle with a longitudinal axis, comprising at least two control members, said control members pivotally mounted to the nozzle respectively on opposite sides of a plane containing said axis, each of said members having opposite ends provided with respective control surfaces, each of said members being pivoted about a single point intermediate said ends, the ends of each member being movable about their axis alternatively to position the respective control surfaces in a position aft of the nozzle to deflect the discharge flow from said nozzle, said members being rotatable in opposite directions about their respective pivots to induce a corresponding roll moment about the longitudinal axis of the nozzle.

7. A roll attitude control device for an aircraft having an exhaust nozzle with a longitudinal axis, comprising at least two control members, said control members pivotally mounted to the nozzle respectively on opposite sides of a plane containing said axis, each of said members having opposite ends provided with respective control surfaces, each of said members being pivoted about a single point intermediate said ends, the ends of each member being movable about their axis alternatively to position the respective control surfaces in a position aft of the nozzle to deflect the discharge flow exhausted from said nozzle, said members being rotatable in opposite directions about their respective pivots to induce a corresponding roll moment about the longitudinal axis of the nozzle.

References Cited in the file of this patent

UNITED STATES PATENTS

| | | |
|---|---|---|
| 1,572,812 | Rees | Feb. 9, 1926 |
| 2,518,697 | Lee | Aug. 15, 1950 |
| 2,620,622 | Lundberg | Dec. 9, 1952 |
| 2,664,700 | Benoit | Jan. 5, 1954 |